United States Patent

[11] 3,630,220

| [72] | Inventor | Lowell F. Nelson |
| | | Muskegon, Mich. |
| [21] | Appl. No. | 9,690 |
| [22] | Filed | Feb. 9, 1970 |
| [45] | Patented | Dec. 28, 1971 |
| [73] | Assignee | Enterprise Brass Works |
| | | Muskegon, Mich. |

[54] HEAT-SENSITIVE VALVE
5 Claims, 6 Drawing Figs.

[52] U.S. Cl. .................................................... 137/77,
251/259, 251/297
[51] Int. Cl. ............................................... F16k 17/38
[50] Field of Search ........................................... 137/72, 73,
75–78; 126/287.5; 251/259, 297, 96; 74/528

[56] References Cited
UNITED STATES PATENTS

| 2,226,843 | 12/1940 | Carlson | 251/259 |
| 1,028,682 | 6/1912 | Creighton et al. | 137/77 |
| 1,998,914 | 4/1935 | Wheaton | 251/259 X |
| 2,640,491 | 6/1953 | MacBain | 137/75 |
| 2,333,100 | 11/1943 | Grant | 251/96 X |

*Primary Examiner*—M. Cary Nelson
*Assistant Examiner*—Richard Gerard
*Attorney*—Barnard, McGlynn & Reising ABSTRACT: A heat-responsive flow valve including a valve body having coaxial inlet and outlet ports, a stop disc carried by a spring-biased axially oriented plunger, an operator shaft extending across and through the valve body and carrying a cam which depresses the spring-biased plunger when rotated. Rotation of the operator shaft is accomplished by means of a handle which is secured to the shaft by a low-melting point solder bond. The handle may be rotated to a open position and latched in that position by means of a detent mechanism. Should a high-temperature condition exist, the solder bond melts and permits the shaft to rotate independently of the handle thereby closing the valve.

PATENTED DEC 28 1971

3,630,220

INVENTOR.
Lowell F. Nelson
BY
Barnard, McGlynn & Reising
ATTORNEYS

HEAT-SENSITIVE VALVE

This invention relates to valves and more particularly to valves which close a flow path in response to an elevated temperature condition.

Temperature responsive valves are often used in systems for dispensing or otherwise handling flammable fluids such as gasoline. Such a valve responds to a high-temperature condition in the vicinity of the valve to cut off further fluid flow thereby to minimize the danger of explosion or fire.

Many such heat-sensitive valves employ a link of fusible material which is set between two parts after the valve is opened to maintain the valve open as long as the link remains in position. However, should a fire develop, the link melts or deforms and permits the two parts to move under the influence of a bias device such as a spring thereby to close the valve. A disadvantage of many implementations of this arrangement is that the valve must be opened and latched in a two-step fashion making it difficult for an operator to perform both tasks with one hand while holding the valve or filler pipe with the other hand.

The present invention provides a temperature-responsive valve which is easily opened and latched open in a single step but which, when open and latched, responds to a high-temperature condition to close thereby terminating further fluid flow therethrough. Moreover, the invention provides a novel valve arrangement in which a fusible link between two mechanical components normally operates as a necessary and totally inconspicuous connection between such parts which, although reworkable, is created in a common assembly step and not by the addition of an otherwise extraneous part. Accordingly, the heat-responsive link which causes the valve to close under high-temperature conditions is established simply by opening and latching the valve per se.

In general, the advantages provided by the subject invention are accomplished by means of a novel valve design in which a spring-biased stop is displaced between open and closed positions by means of an operator linkage which includes two members such as a shaft and handle. One of the two members directly affects the displacement of the stop and the other is ordinarily employed to accomplish displacement of the first member. The two members are bonded together by means of a heat-sensitive material such as solder having a low melting point. Accordingly, when the bond material is rigid, the two members are secured together and may be displaced together to a valve-opened position where the two members will stay after the second member is latched to the valve body or some other fixed reference point. However, should the bond material be subjected to a high temperature, the material melts and the valve-stop-displacing member becomes free to be displaced by the spring-biased stop to the closed valve position.

The preferred embodiment of the invention includes a valve body having axially aligned inlet and outlet ports, a stop seated in one of the ports to regulate fluid flow and a spring-biased plunger connected to the stop and axially oriented within the valve body. An operator shaft extends through the valve body and carries a cam which is rotatable with the operator shaft to displace the spring-biased plunger to the valve open condition. The shaft carries externally of the valve body a handle which can be rotated to a valve-opened position and latched in this position by means of a suitable detent mechanism. The operator shaft and the handle are bonded together by means of a low melting temperature solder such that when the solder is solid, the two members rotate together. However, when the solder melts due to a high temperature condition, the operator shaft may rotate independently of the latched handle to permit the spring-biased plunger to return to the valve open position.

The various features and advantages of the invention will be better understood by reading the following specification which describes an illustrative embodiment of the invention. This specification is to be taken with the accompanying FIGURES of which:

Figure 1:
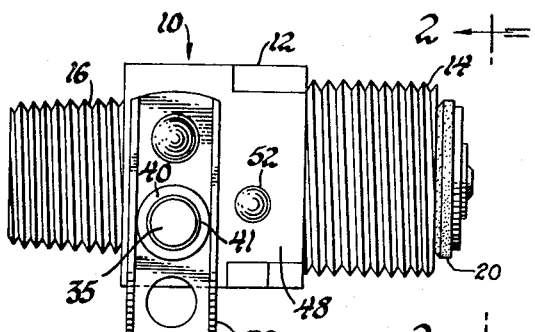
FIG. 1 is a side view of a valve assembly embodying the invention.

Referring to the FIGURES, the valve assembly 10 which embodies the invention is shown to include a hollow cylindrical valve body 12 having a threaded inlet portion 14 at one end and an axially aligned threaded outlet portion 16 at the other end. The valve body 12 defines a fluid flow path between the inlet and outlet portions 14 and 16, respectively. The ends designated input and outlet may, of course, by reversed and have no significant bearing on the operation of the valve assembly 10.

The inlet portion 14 is provided with an end surface 18 which defines a seat against which a beveled stop disc 20 of relatively pliable material may rest to interrupt the flow of fluid through the valve body 12. The stop disc 20 is suitably connected to a plunger shaft 22 which is axially oriented within the valve body 12 and mounted for displacement between valve-opened and valve-closed positions as will be subsequently described.

The end of the plunger shaft 22 opposite the stop disc 20 carries a retainer ring 24 which is snapped around the shaft to provide a footing for a helical spring 28. Spring 28 extends between the retainer ring 24 and an internally depending support member 30 which is formed integrally with the valve body 12 adjacent the input end 14. Accordingly, the spring 28 exerts a bias force on the plunger shaft 22 tending to seat the stop disc 20 on the end surface 18 and thereby to prevent the flow of fluid through the valve body 12.

To control the displacement of the plunger shaft 22 relative to the valve body 12, an operator means 26 is provided and includes an operator shaft 32 which extends across the valve body 12 substantially perpendicular to but radially offset from the plunger shaft 22 as shown. The operator shaft 32 is provided with a center portion 33 having diametrically opposite flats and which extends through shoulder portions 34 formed integrally with the body 12. Shaft 32 also is provided with cylindrical end portion 35 shown in FIG. 5 for purposes to be described. Seal rings 36 are provided in the areas shown in FIG. 5 where the shaft 32 extends through the body 12 to prevent leakage of fluid from the flow passage through the apertures provided for the shaft 32. A generally oblong cam 37 is eccentrically secured to the shaft 32 for rotation therewith and is disposed within the valve body 12 so as to be directly within the flow path. It can be seen that as the shaft 32 is rotated, the cam 37 is brought into engagement with the end of the plunger shaft 22 and that further rotation of the shaft 32 is effective to depress the plunger shaft 22 against the force of the bias spring 28. This, or course, unseats the stop disc 20 and permits fluid to flow through the valve body 12 in one direction or the other.

Figure 2:
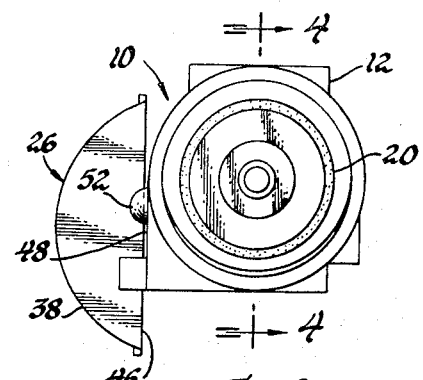
FIG. 2 is an end view of the assembly of FIGURE 1.
Figure 3:
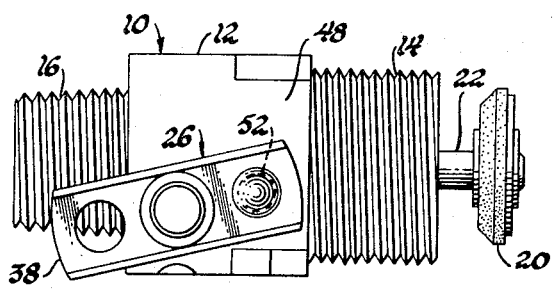
FIG. 3 is a side view of the assembly of FIG. 1 in an opened condition.
Figure 5:
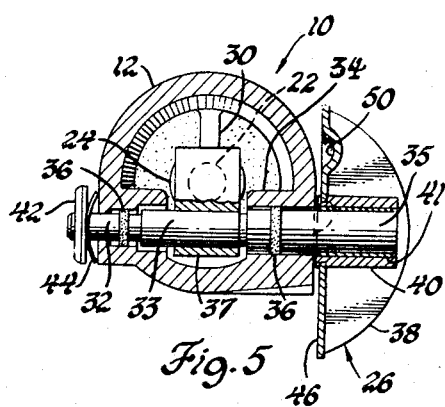
FIG. 5 is an end view in cross section taken along a line 5—5 of FIG. 4.

The operator means 26 of the illustrated embodiment includes, in addition to the shaft 32, a second member in the form of a rectangular handle 38 having a semicircular profile which shows up in FIGS. 2 and 5. Handle 38 has a cylindrical recess 40 which extends therein from the flat plane surface 41. The recess defined by an inner wall 40 which is adapted to receive the end portion 35 of the shaft 32. End portion 35 of shaft 32 is bonded to the cylindrical inner wall 40 of handle 38 by means of a low melting point solder 41 shown in FIG. 5 such that, as long as the band 41 is intact, the rotation of handle 38 relative to valve body 12 causes rotation of shaft 32 and operation of the valve as previously described.

The opposite end of the operator shaft 32 is provided with a retainer ring 42 which is disposed exteriorly of the valve body 12 along with a spring washer 44 which encircles the shaft 32 and biases the shaft 32 into the valve body 12 from right to left as seen in FIG. 5.

Figure 4:
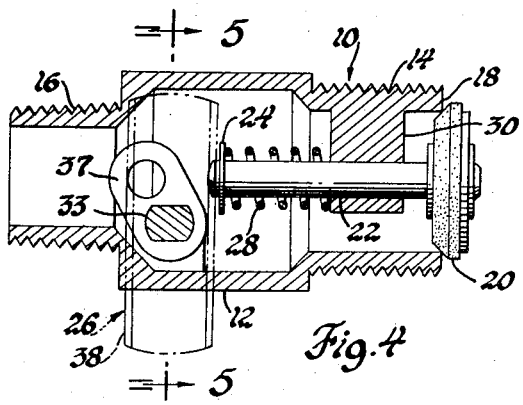
FIG. 4 is a cross-sectional view taken along a section line 4—4 of FIG. 2.
Figure 6:
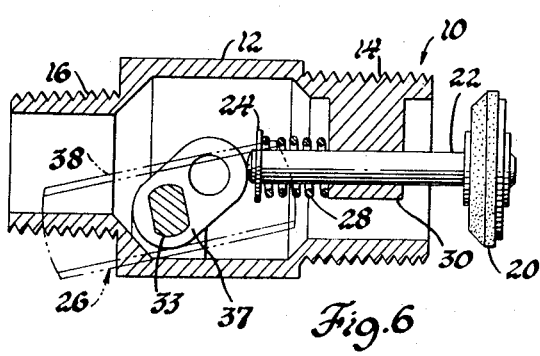
FIG. 6 is a side view in cross section of the assembly in the opened condition.

The handle 38 is rotatable relative to the valve body 12 as previously described to engage the cam 37 with the shaft 22 thereby to unseat the disk 20. To maintain the handle 38 and the shaft 32 in the valve open position, a detent mechanism is provided between the inner surface 46 of the handle 38 and the sidewall 48 of the valve body 12. This detent mechanism includes a semispherical recess 50 in the handle 38 which is adapted to receive the unslotted head of a screw 52 which is driven into the sidewall 48 of the valve body 12 as best shown in FIGS. 1 and 2. Screw 52 is located such that the head is received into the recess 50 in handle 38 after about 90° of rotation from the closed-valve position. The amount of rotation is represented in FIGS. 4 and 6. The spring washer 44 permits axial displacement of operator shaft 32 through the valve body 12 to accomplish the seating of screw 52 in the recess 50. The latch force on the handle 38 can be readily overridden by manual operation.

In assembly, the end 35 of the shaft 32 is rigidly bonded to the internal wall 40 of the handle 38 by means of a low melting point solder 41. The solder bond between the shaft 32 and the handle 38 causes the shaft 32 to be rotated with the handle 38 thereby to rotate the cam 37 relative to the valve body 12. Rotation of the shaft 32 causes engagement of the cam 37 with the plunger shaft 22 and ultimately results in unseating the stop disc 20. This permits fluid to flow through the valve body 12.

In the event of a fire, the high-temperature condition in the vicinity of the valve body 12 causes the low melting point solder 41 to melt. This releases the mechanical bond between the shaft 32 and the handle 38. As the solder bond 41 melts between the handle and the shaft 32, the shaft is permitted to rotate independently of the handle. Accordingly, the torque exerted on the shaft 32 by the spring-biased plunger shaft 22 acting through the eccentric cam 37 causes the shaft 32 to rotate seating the stop disc 20 against the end surface 18 thereby closing the valve assembly 10 against further fluid flow. Assuming the valve assembly 10 is otherwise in good condition, the solder 41 can be readily reworked to restore normal operation.

It is to be understood that the foregoing description is illustrative in character and is not to be construed in a limiting sense.

The embodiments of the invention in which an exclusive property or privilege is claimed are defined as follows:

1. A heat-sensitive valve assembly comprising: a valve body defining a fluid flow path, stop means including a plunger shaft disposed axially in the path and displaceable between open and closed positions, means biasing the stop means to the closed position, operator means including a shaft rotatably carried by the body, a handle in engagement with the shaft, cam means carried eccentrically by the shaft and engaging the stop means to cause displacement of the top means, the shaft extending across the flow path and the cam means being in the flow path, latch means including a detent mechanism for latching the handle relative to the valve body in a position corresponding to the open position, and a heat-sensitive bond between the shaft and handle which at normal temperatures produces a rigid mechanical connection between said members but at elevated temperatures melts to permit the shaft to be displaced independent of the handle, and spring means carried by the shaft and biasing the handle toward the body to actuate the detent mechanism.

2. The assembly of claim 1 wherein the valve body defines axially aligned fluid inlet and outlet ports.

3. The assembly of claim 1 wherein the stop means includes a seat defined by the body, a disk cooperable with the seat to close the flow path, and a plunger shaft secured to the disk, the bias means including a spring connected between the body and the plunger shaft to seat the disk.

4. The apparatus of claim 1 wherein the handle includes a generally cylindrical recess for receiving the operator shaft.

5. A valve assembly comprising: a body having axially aligned inlet and outlet ports and a fluid path between the ports, a stop disc seatable against the body in one of the ports to regulate fluid flow, an axially oriented plunger secured to the disc, a helical spring connected between the body and plunger to bias the stop disc toward a seated position, an operator shaft extending fully through the valve body perpendicular to the flow path, a cam eccentrically secured to the operator shaft in the flow path and rotatable with the shaft to displace the plunger and disc to an unseated position, means sealing the operator shaft relative to the body, a handle carried by one end of the shaft, a spring washer on the other end of the operator shaft and urging the handle toward the body, detent means operatively disposed between the body and handle and actuated upon movement of the handle by the spring washer for latching the handle in the open-valve position, and a low melting temperature solder bond between the handle and shaft which melts at elevated temperatures to permit the shaft to turn independently of the handle under the force of the helical bias spring.

* * * * *